US008203626B2

(12) United States Patent
Ota

(10) Patent No.: US 8,203,626 B2
(45) Date of Patent: Jun. 19, 2012

(54) APPARATUS AND METHOD FOR IMAGE PROCESSING WITH SPECIAL EFFECT APPLICATION TO IMAGE AND DISPLAY OF ANIMATION IMAGE

(75) Inventor: Tomohiro Ota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1328 days.

(21) Appl. No.: 11/130,958

(22) Filed: May 17, 2005

(65) Prior Publication Data

US 2005/0264669 A1 Dec. 1, 2005

(30) Foreign Application Priority Data

May 31, 2004 (JP) ................................ 2004-162455

(51) Int. Cl.
*H04N 9/74* (2006.01)
*H04N 5/262* (2006.01)
(52) U.S. Cl. ........................................ 348/239; 348/578
(58) Field of Classification Search .................. 348/239, 348/333.11, 578; 375/240
See application file for complete search history.

(56) References Cited

U.S. PATENT DOCUMENTS

| 5,194,952 | A  | * | 3/1993  | Pelley ............................ 348/594 |
| 5,355,450 | A  | * | 10/1994 | Garmon et al. ................ 345/501 |
| 5,682,326 | A  | * | 10/1997 | Klingler et al. ............... 715/202 |
| 6,160,548 | A  | * | 12/2000 | Lea et al. ...................... 715/723 |
| 6,204,840 | B1 | * | 3/2001  | Petelycky et al. ............. 715/202 |
| 6,546,187 | B1 |   | 4/2003  | Miyazaki et al. |
| 6,570,581 | B1 | * | 5/2003  | Smith ........................... 345/632 |
| 6,683,649 | B1 | * | 1/2004  | Anderson ................ 348/333.05 |
| 2002/0105589 | A1 | * | 8/2002 | Brandenberger et al. ..... 348/360 |
| 2002/0163531 | A1 | * | 11/2002 | Ihara et al. ..................... 345/719 |
| 2003/0025811 | A1 | * | 2/2003 | Keelan et al. ................. 348/239 |
| 2003/0052909 | A1 | * | 3/2003 | Mo et al. ....................... 345/716 |
| 2004/0101206 | A1 | * | 5/2004 | Morimoto et al. ............ 382/254 |
| 2005/0007468 | A1 | * | 1/2005 | Stavely et al. ................ 348/239 |

FOREIGN PATENT DOCUMENTS

| JP | 10-200814 A   | 7/1998 |
| JP | 2002-152591 A | 5/2002 |
| JP | 2002-237973   | 8/2002 |
| JP | 2003-092706 A | 3/2003 |

OTHER PUBLICATIONS

The Japanese references were cited in the Mar. 24, 2010 IDS were cited a Mar. 9, 2010 Japanese Office Action, which is enclosed with a partial English Translation, that issued in Japanese Patent Applcation No. 2004-162455.

* cited by examiner

*Primary Examiner* — David Czekaj
*Assistant Examiner* — David N Werner
(74) *Attorney, Agent, or Firm* — Cowan, Liebowitz & Latman, P.C.

(57) ABSTRACT

An image processing apparatus is arranged so that when a special effect to be applied to an input image is selected, an image showing the behavior of the special effect is displayed during the selection, comprising an image input unit for inputting an image; a selecting unit for selecting a special effect to be applied to the input unit; an effect applying unit for applying the selected special effect to the input unit; a special effect image display unit for displaying an image showing behavior of the selected special effect during the selection by the selecting unit; and a display unit for displaying the image to which the effect applying unit has applied the special effect.

2 Claims, 9 Drawing Sheets

APPARATUS AND METHOD FOR IMAGE PROCESSING WITH SPECIAL EFFECT APPLICATION TO IMAGE AND DISPLAY OF ANIMATION IMAGE

BACKGROUND OF THE INVENTION

1. Field of the Invention

The present invention relates to an image recording apparatus, and in particular, to a video recording apparatus that can subject a photographed video image to special effects and record the subjected video image.

2. Related Background Art

A conventional digital video camera that is an image recording apparatus can record a video image of an object being photographed after subjecting it to an effect such as a selected mosaic or a color effect, or a special effect such as wipe or dissolve. When a special effect to be applied to the video image is selected, a character string indicating this effect is displayed (FIG. 9) or a preview of the video image actually subjected to the selected effect is displayed.

However, in case that the character string indicating the effect is displayed (FIG. 9), a user cannot view the behavior of the effect until the effect is applied to the video image after the effect to be actually applied has been selected. Accordingly, when the user does not understand the special effect, it is necessary to repeat, many times, selection of an effect and viewing of the video image to which the special effect has been applied, until a desired effect is selected.

On the other hand, in case that the video image of the object to which the selected effect has actually been applied is displayed as the preview, if the effect is selected during recording of the video image, an unsightly video images are disadvantageously recorded, which are subjected to various effects which are sequentially switched before the user's desired effect is viewed and selected.

The present invention provides a video recording apparatus that can allow the user to easily select a desired special effect.

SUMMARY OF THE INVENTION

According to one aspect of the present invention, an image processing apparatus of the present invention comprises:

image input means for inputting an image;

selecting means for selecting a special effect to be applied to the input image;

effect applying means for applying the selected special effect to the input image;

special effect image display means for displaying an image showing behavior of the selected special effect during the selection by the selecting means; and display means for displaying the image to which the effect applying means has applied the special effect.

This configuration allows a user to preview the behavior of the selected special effect, so that a user can easily select the desired special effect. This makes it possible to promptly apply the special effect, thereby improving utility for the user.

According to another aspect of the present invention, a method of processing an image, comprises:

an inputting step of inputting an image;

a selecting step of selecting a special effect to be applied to the input image;

an effect applying step of applying the selected special effect to the input image;

a special effect image displaying step of displaying an image showing behavior of the selected special effect during the selecting step; and a displaying step of displaying the video image to which the special effect has been applied in the effect applying step.

Other objects and features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will be described in detail in accordance with the accompanying drawings.

First Embodiment

In the present embodiment, the present invention is applied to a process of using a digital effect (special effect) function of a digital video camera, that is, a process of selecting an effect to be applied, applying the selected effect to a video image being photographed, and recording the processed video image onto a cassette tape or outputting it to a monitor.

Figure 1:
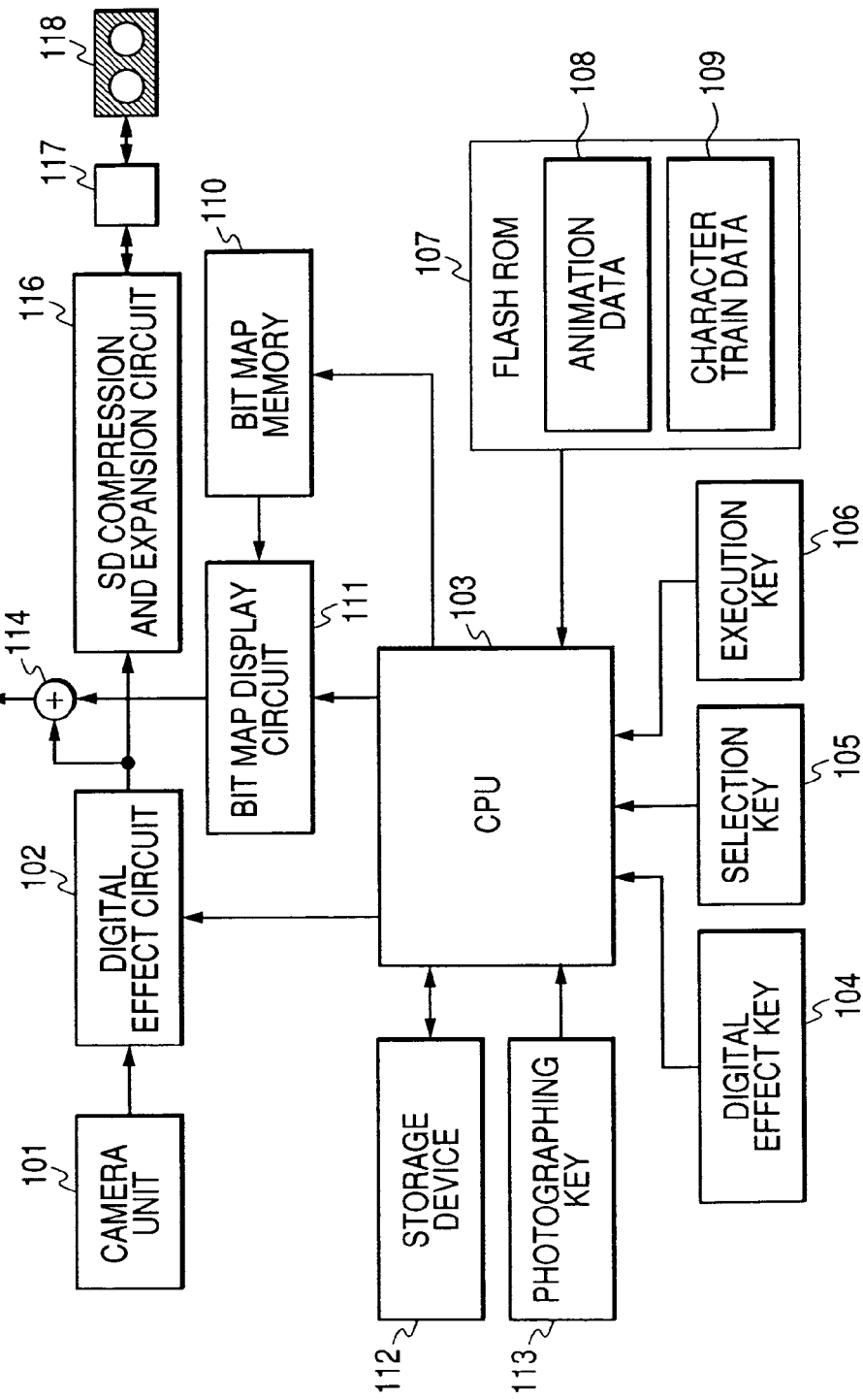
FIG. 1 is a block diagram schematically showing the configuration of a video recording apparatus according to an embodiment of the present invention.

FIG. 1 is a block diagram schematically showing the configuration of a video recording apparatus according to the embodiment of the present invention.

In FIG. 1, a video signal obtained using a camera section 101 is subjected by a digital effect circuit 102 to a special effect (or may pass through the digital effect circuit 102 without being processed). The video signal is then passed to an image composition circuit 114 and an SD compression and expansion circuit 116. The SD compression and expansion circuit 116 compresses the video image. The compressed video image is then recorded on a cassette tape 118 via a recording and reproducing amplifier 117. On the other hand, a CPU 103 manages the operation of the whole digital video camera on the basis of inputs from a digital effect key 104, a selection key 105, an execution key 106, and a photographing key 113. The digital effect circuit 102 determines the operation by receiving an instruction from the CPU 103, which has read a set value of a digital effect from a storage device 112 which stores such set values. The CPU 103 reads animation data 108 and character string data 109 stored in a flash ROM 107. The CPU 103 also outputs a processed display signal to a bit map memory 110. Since the flash memory and the like thus store the animation image data and character string data, indicating special effect types, an animation image and a character string can be quickly displayed when the corresponding special effect is previewed. Further, since an animation image is previewed together with a character string for selection in accordance with the type of the corresponding special effect, this makes it possible to reliably show a user what the special effect is.

The image composition circuit 114 synthesizes a video signal from the digital effect circuit 102 with a display signal containing the animation data 108 and character string data obtained by the bit map display circuit 111 by reading data from the bit map memory 110. The image composition circuit 114 then outputs a signal resulting from the synthesis to a monitor 115.

The video signal obtained from the camera section 101 via the digital effect circuit 102 is output to both monitor 115 and cassette tape 118. On the other hand, the signal obtained from the bit map display circuit 111 is sent only to the monitor 115 and is not recorded on the cassette tape 118.

Figure 2:
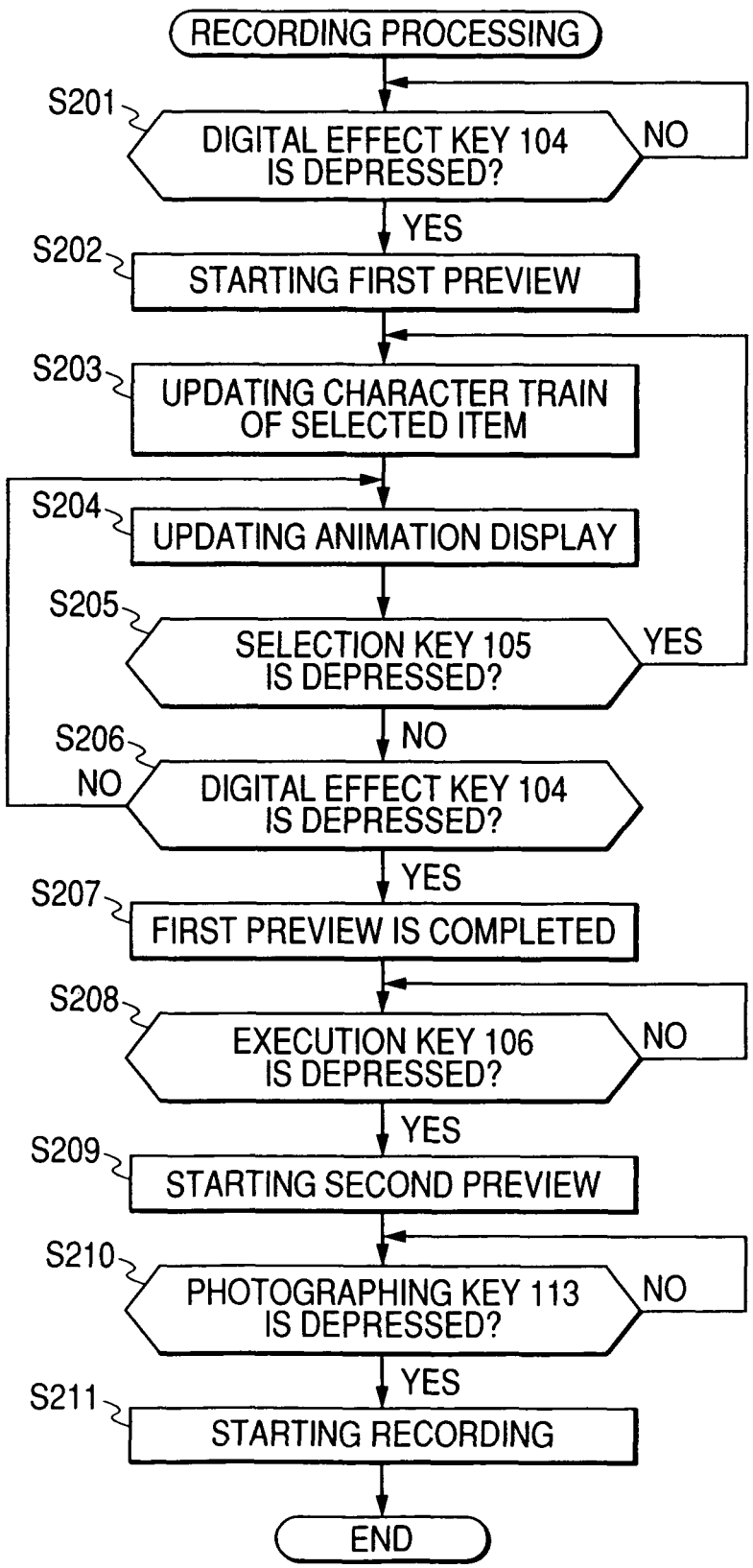
FIG. 2 is a flowchart showing a pre-recording process executed by the video recording apparatus shown in FIG. 1, wherein recording is started after a digital effect has been selected.

FIG. 2 is a flowchart showing a pre-recording process executed by the video recording apparatus shown in FIG. 1, wherein recording is started after a digital effect has been selected.

Up to start of the present process, the image composition circuit 114 has already synthesized the video signal, a time code, and the display signal and output the synthesized signal to the monitor; the video signal has been obtained using the camera section 101 and passed through the digital effect circuit 102 without being processed, the time code has been written by the CPU 103 into a bit map memory 110 and output from a bit map display circuit 111, and the display signal indicates the operational status of the digital video camera. In this stage, recording onto the cassette tape 118 has not yet performed.

Figure 4:
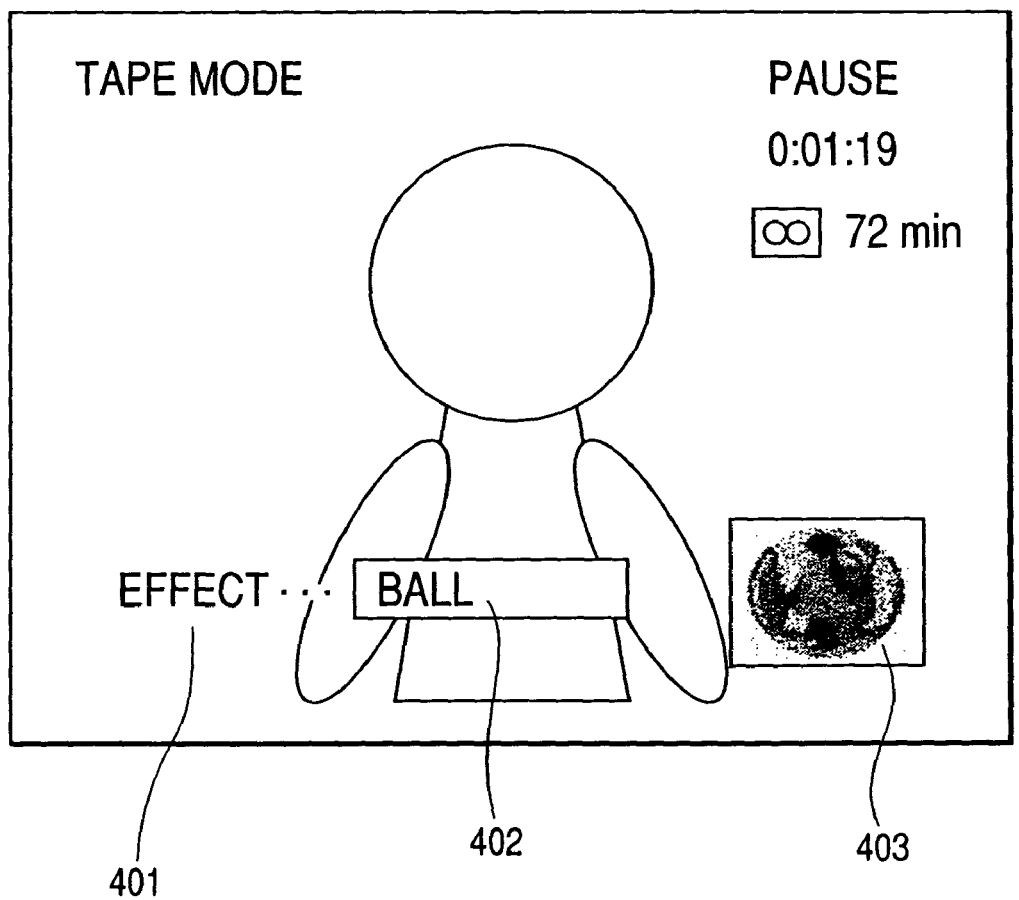
FIG. 4 is a diagram of a first preview screen for the digital effect.

In FIG. 2, depressing the digital effect key 104 (YES in step S201) causes animation data 108 and character string data 109 to be loaded into the CPU 103; the animation data 108 and character string data 109 corresponding to the set value for the digital effect stored in the storage device 112. The animation data 108 and character string data 109 are then output to the monitor 115 as first preview as shown in FIG. 4, described later (step S202) (preview device). At this time, the digital effect circuit 102 does not act on the video image from the camera section 101. FIG. 4 shows an effect selection screen 401 displayed in the lower left area of the display screen, a currently selected effect 403 displayed in the lower center area 402 of the display screen, for example, a "ball", and an animation 403 displayed in the lower right area of the display screen and showing an effect obtained when the "ball" is applied to the video image.

Figure 7:
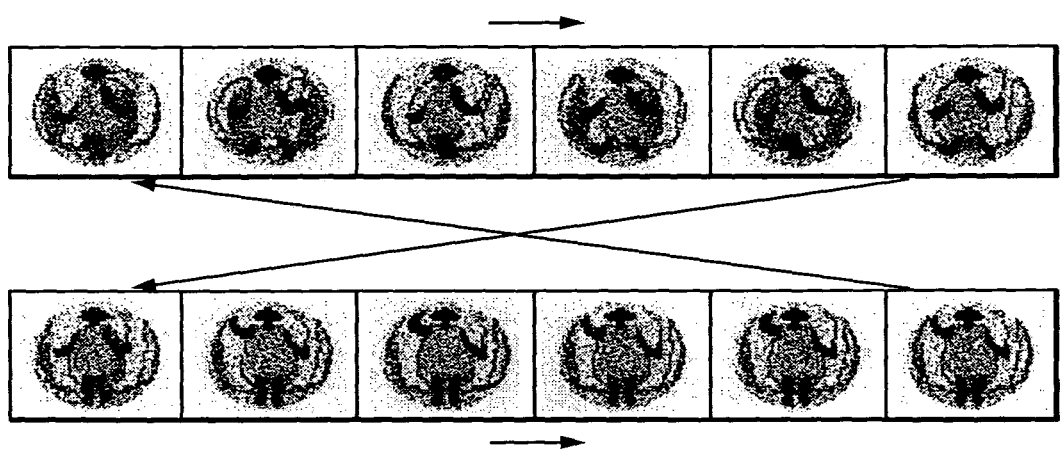
FIG. 7 is a diagram of animation data of a "ball"

Displayed animation data imitates an output video image obtained by applying an effect to the video image from the camera. As shown in FIG. 7, the animation is displayed by sequentially updating a frame every predetermined time (step S204). FIG. 7 shows that animation data is sequentially read and displayed starting from an upper left frame upper right frame, shifting from the upper right frame to lower left frame, and ending at a lower right frame.

Figure 8:
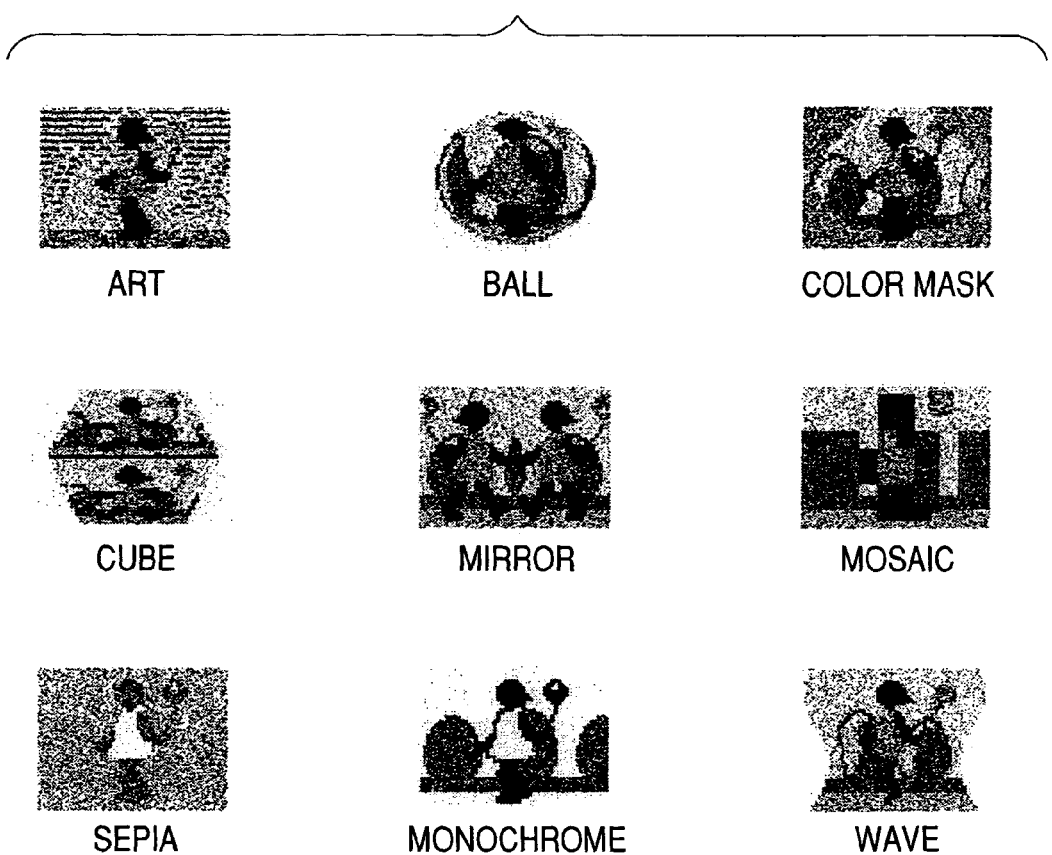
FIG. 8 is a diagram showing digital effect types and animation images.
Figure 9:
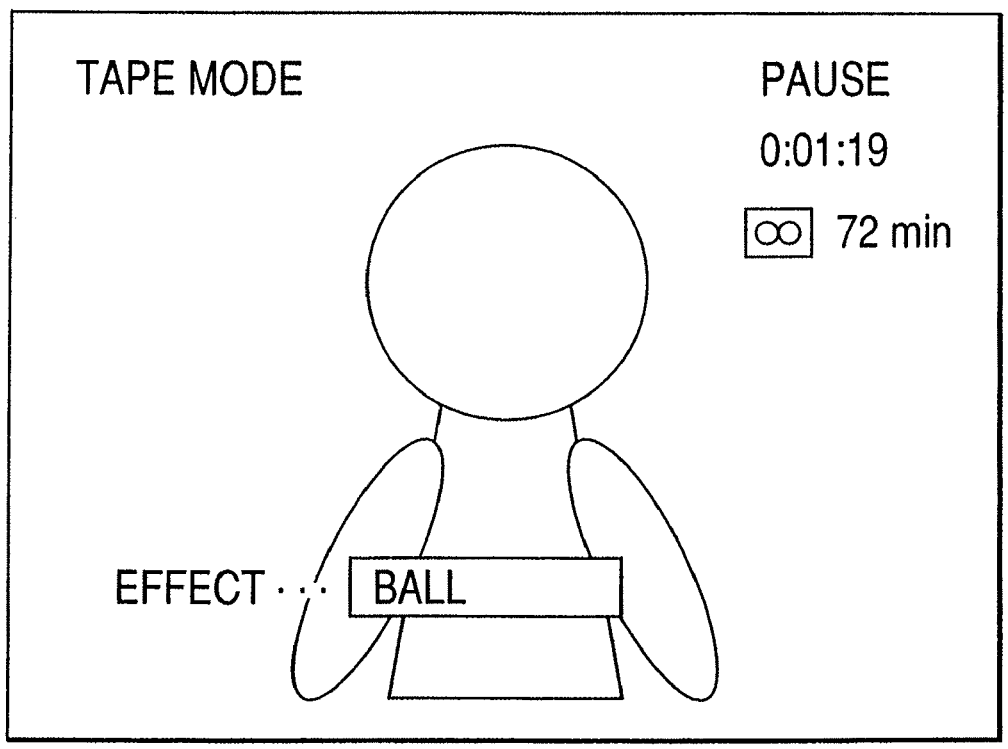
FIG. 9 is a diagram of a conventional digital effect selection screen.

Then, every depression of the selection key 105 (YES in step S205) causes new character string data 109 and animation data 108 to be read and switches the type of an effect to be previewed (steps S203 and S204). The previewed effect type and animation image are, for example, as shown in FIG. 8.

Figure 5:
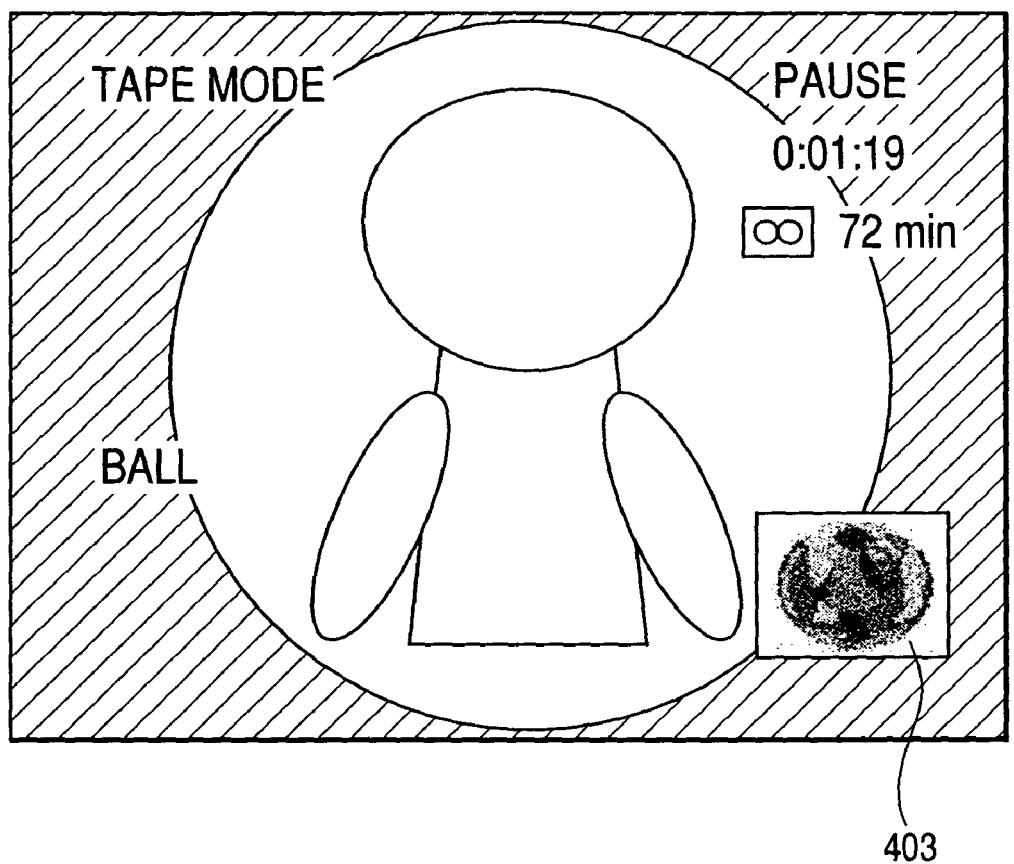
FIG. 5 is a diagram of a second preview screen for the digital effect.

Depressing the digital effect key 104 again (YES in step S206) causes the effect being previewed to be stored into the storage device 112. The first preview is thus completed (step S207). Subsequent depression of the execution key 105 (YES in step S208) causes a set value read from the storage device 112 to be passed to the digital effect circuit 102. The corresponding effect starts to be applied to the video image from the camera section. That is, a second preview is started (step S209). FIG. 5 shows the configuration of a screen output to the monitor 115 in this case. In FIG. 5, the lower left area of the screen indicates that the "ball" effect is being previewed. A video image is displayed, which has been obtained by actually applying the "ball" effect been applied to the video signal from the camera section 101. The upper right area of the screen indicates that the current recording status is "pause", that is, recording of the video is not being carried out. In this manner, the selected special effect is applied to the photographed video image to be previewed. This makes it possible to show the user what video image is resulted in from the application of the special effect to the photographed video image. The user can then easily select a special effect to be applied to the photographed video image.

In the second preview, when displaying the video signal to which the digital effect circuit 102 has applied the special effect selected by the user, as well as the display signal containing the animation data 108 and the character string data, the image composition circuit 114 may synchronize the behavior of the animation data with the behavior of the special effect being applied to the video signal under the control of the CPU 103. This allows behavior similar to that confirmed in the animation image in the first preview, to be applied to the video signal. The user can thus more easily understand the behavior of the special effect applied by the animation image.

Moreover, depressing the photographing key 113 (YES in step S210) causes the video image to which the digital effect has been applied, to be sent to the recording and reproducing amplifier 117 via the SD compression and expansion circuit 116 to start recording onto the cassette tape 118 (step S211). Then, the present process is completed.

Figure 6:
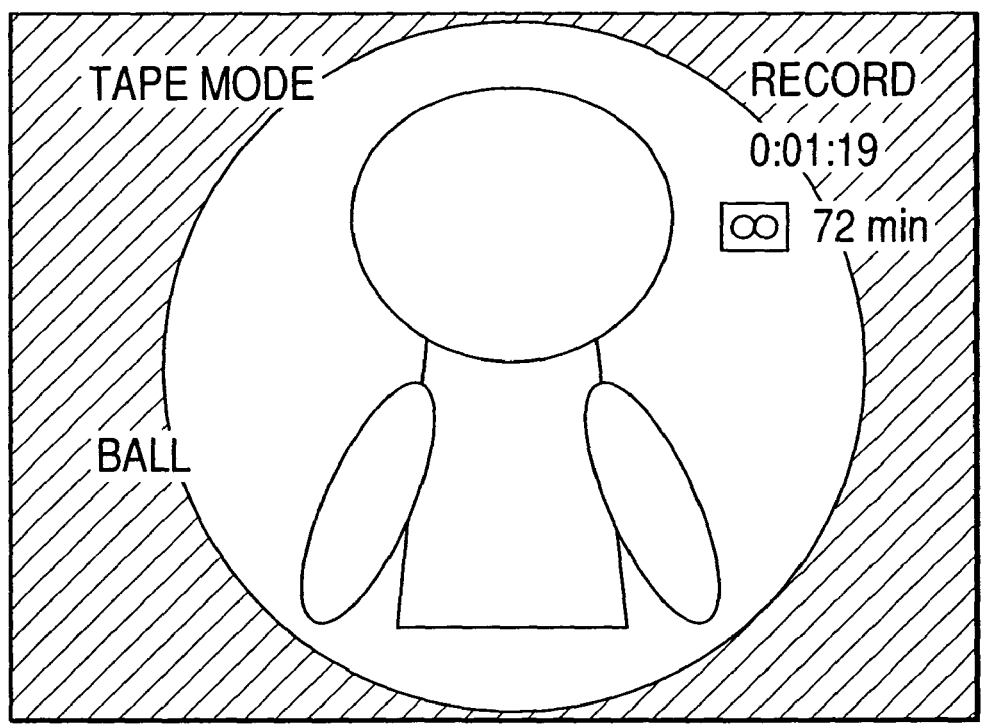
FIG. 6 is a diagram of a digital effect photographing screen.

FIG. 6 shows the configuration of a screen output to the monitor 115 in step S211. In FIG. 6, the lower left area of the screen indicates that the "ball" effect has been applied. This area actually displays a video image obtained by actually applying the ball effect to the video signal from the camera section 101. The upper right area of the screen indicates that the current recording status is "recording", that is, the video image is being recorded.

With the process shown in FIG. 2, depressing the digital effect key 104 (YES in step S201) causes animation data 108 and character string data 109 to be read and output by the CPU 103 to the monitor 115 as a first preview (step 202); the animation data 108 and character string data 109 corresponding to the set value of the digital effect stored in the storage device 112. Consequently, the user can easily select the desired special effect.

Second Embodiment

Now, a second embodiment of the present invention will be described.

Figure 3:
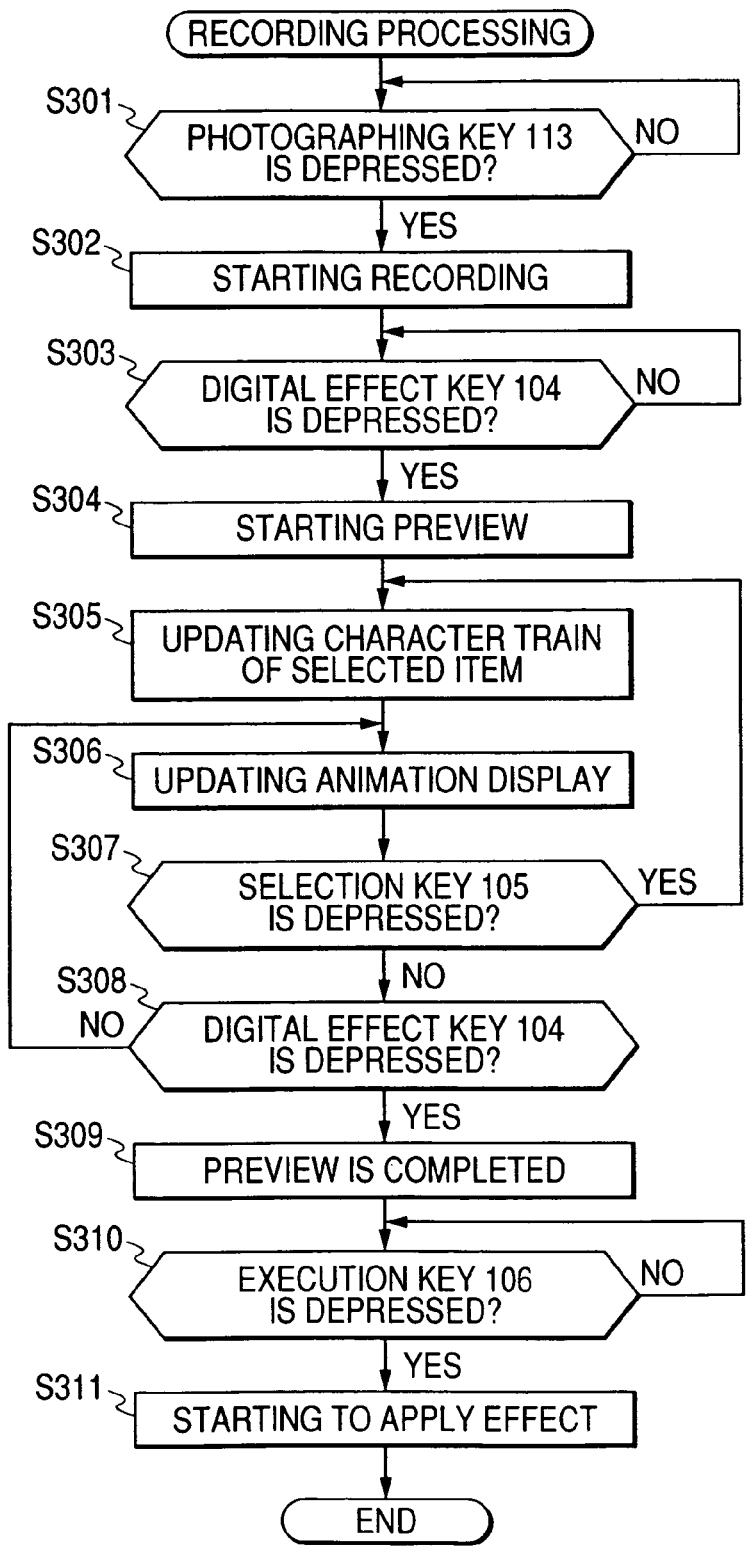
FIG. 3 is a flowchart showing a recording process executed by the video recording apparatus in FIG. 1, wherein the digital effect is selected during recording.

FIG. 3 is a flowchart showing a recording process executed by the video recording apparatus in FIG. 1, wherein a digital effect is selected during recording.

In FIG. 3, depressing the photographing key 113 (YES in step S301) causes a video image to which the digital effect has been applied, to be sent to the recording and reproducing amplifier 117 via the SD compression and expansion circuit 116 to start recording onto the cassette tape 118 (step S302).

Depressing the digital effect key 104 (YES in step S303) causes animation data 108 and character string data 109 to be read and output by the CPU 103 to the monitor 115 as shown in FIG. 4 (step S304); the animation data 108 and character string data 109 corresponding to the set value of the digital effect stored to the storage device 112. At this time, the digital effect circuit 102 does not act on the video image from the camera section 101.

The animation data displayed in step S304 imitates an output video image obtained by applying an effect to the video image from the camera. As shown in FIG. 7, the animation is displayed by sequentially updating a frame every predetermined time (step S306).

Then, every depression of the selection key 105 (YES in step S307) causes new character string data 109 and animation data 108 to be read and switches the type of an effect to be previewed (steps S305 and S306).

Depressing the digital effect key 104 again (YES in step S308) causes the effect being previewed to be stored into the storage device 112. The preview is thus completed (step S309). Subsequent depression of the execution key 105 (YES in step S310) causes the effect to start to be applied to the video image (step S311). The video image to which the effect has been applied is output to the monitor 115 and the cassette tape 118. The processing is then completed.

With the process shown in FIG. 3, depressing the execution key (YES in step S310) causes the effect to immediately start to be applied (step S311). The video image to which the effect has been applied is then output to the monitor 115 and the cassette tape 118. This prevents the user from uselessly recording video images when selecting a special effect.

Other Embodiment

In the description of the above embodiments, a digital effect is applied to a video signal obtained with the camera section 101. However, it is possible to read a video signal recorded on the cassette tape and applies a digital effect to the video signal during reproduction thereof. If the digital effect is applied during reproduction, the video signal read from the cassette tape 118 is sent to the SD compression and expansion circuit 116 via the recording and reproducing amplifier 117. In the SD compression and expansion circuit 116, the signal is expanded. Subsequently, as in the case of the processing in the first embodiment, the image composition circuit 114 synthesizes a video signal to which the digital effect circuit 102 has applied the user's selected special effect, with a display signal containing character string data. The image composition circuit 114 then outputs the resulting signal to the monitor 115.

The object of the present invention can also be achieved by providing a storage medium storing program codes for performing the aforesaid processes to an image sensing system or apparatus, reading the program codes, by a CPU or MPU of the image sensing system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image sensing system or apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or apparatus or in a memory provided in a function expansion unit which is connected to the image sensing system or apparatus, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart of FIGS. 2 and 3 described in the embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-162455 filed on May 31, 2004, which is hereby incorporated by reference herein.

What is claimed is:

1. A digital camera comprising:
   a video image obtaining unit;
   a display device;
   an image processing unit configured to apply a special effect to a video image obtained by the video image obtaining unit;
   a recording unit configured to record the video image on a recording medium;
   a selecting unit configured to changeably select the special effect to be applied to the obtained video image by the image processing unit, while the recording unit is recording the video image on the recording medium;
   a deciding unit configured to decide the selection of the special effect by the selecting unit; and
   an instructing unit configured to instruct the image processing unit to start applying to the obtained video image the special effect the selection of which is decided by the deciding unit,
   wherein in a time period during which the recording unit is recording the video image obtained by the video image obtaining unit on the recording medium, the selecting unit changeably selects the special effect and until the deciding unit decides the selection of the special effect by the selecting unit, the recording unit records the video image to which the special effect changeably selected by the selection unit is not applied to the obtained video image by the image processing unit, on the recording medium and the display device displays an animation which imitates a video image to which the special effect changeably selected by the selection unit is applied, and a character string which represents a name of the selected special effect, together with the obtained video image to which the processing unit has not applied the special effect changeably selected by the selection unit and changes the displayed animation and character string in accordance with the selected special effect being changed by the selecting unit,
   wherein in accordance with the deciding unit deciding the selection of the special effect, an information corresponding to the selected special effect is stored in a memory and the display unit stops displaying the animation, and wherein after the display unit stops displaying the animation, in accordance with the instructing unit instructing to start to apply the special effect to the obtained video image, the image processing unit starts to apply the special effect to the obtained video image and the recoding unit records the video image to which the special effect is applied by the image processing unit, on the recording medium.

2. A control method performed in a digital camera including a video image obtaining unit, comprising:

a photographing step of obtaining a video image with the video image obtaining unit;

a display step of displaying the video image obtained in the photographing step on a display device;

an image processing step of applying a special effect on to the video image obtained in the photographing step;

a recording step of recording the video image obtained in the photographing step on a recording medium;

a selecting step of changeably selecting the special effect to be applied to the obtained video image in the image processing step, while the video image on the recording medium is being recorded in the recording step;

a deciding step of deciding the selection of the special effect in the selecting step; and an instructing step of instructing the image processing step to start applying to the obtained video image the special effect the selection of which is decided in the deciding step, wherein in a time period during which the recording step is recording the video image obtained in the photographing step on the recording medium, the selecting step changeably selects the special effect and until the deciding step decides the selection of the special effect in the selecting step, the recording step records the video image to which the special effect changeably selected in the selecting step is not applied to the obtained video image in the image processing step, on the recording medium and the display step displays an animation which imitates a video image to which the special effect changeably selected in the selecting step is applied, and a character string which represents a name of the selected special effect, together with the obtained video image to which the processing unit has not applied the special effect selected in the selecting step and changes the displayed animation and character string in accordance with the selected special effect being changed in the selecting step, wherein in accordance with the deciding step deciding the selection of the special effect, an information corresponding to the selected special effect is stored in a memory and the display step stops displaying the animation, and wherein after the display step stops displaying the animation, in accordance with the instructing step instructing to start to apply the special effect to the obtained video image, the image processing step starts to apply the special effect to the obtained video image and the recoding step records the video image to which the special effect is applied in the image processing step, on the recording medium.

* * * * *